(No Model.)

M. W. MEAGHER & J. C. ANDERSON.
NUT LOCK.

No. 278,032. Patented May 22, 1883.

Witnesses:

Inventors:
M. W. Meagher
J. C. Anderson,
By Stout & Underwood
Attorneys.

UNITED STATES PATENT OFFICE.

MICHELANGELO W. MEAGHER, OF NEW YORK, N. Y., AND JAMES C. ANDERSON, OF WINNIPEG, MANITOBA, CANADA.

NUT-LOCK.

SPECIFICATION forming part of Letters Patent No. 278,032, dated May 22, 1883.

Application filed April 13, 1883. (No model.)

*To all whom it may concern:*

Be it known that we, MICHELANGELO WILLIAM MEAGHER, of New York, county and State of New York, and JAMES C. ANDERSON, of Winnipeg, Manitoba, in the Dominion of Canada, have invented certain new and useful Improvements in Nut-Locks for Railroad Fish-Plates; and we do hereby declare that the following is a full, clear, and exact description thereof.

Our invention relates particularly to railroad fish-plates; and it consists in a nut-lock therefor of peculiar construction, as will be fully described hereinafter.

Figure 1:
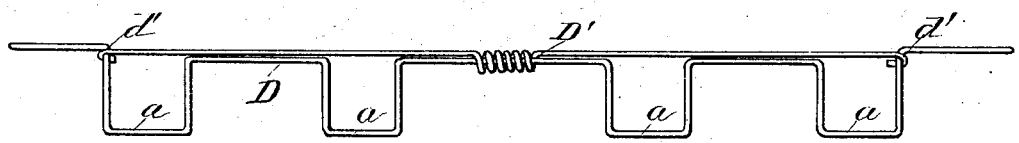
Figure 2:
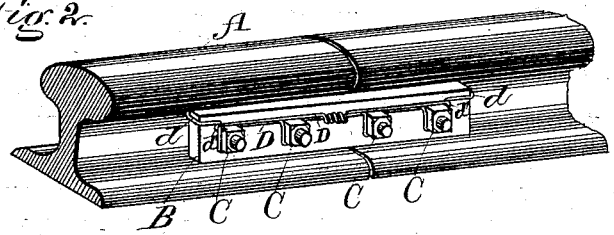

In the drawings, Figure 1 is a side view of our device. Fig. 2 is a perspective view of the adjacent portion of two rail-sections and a fish-plate, with our device in position.

A is the rail, and B is the fish-plate, and C are nuts that, screwing onto suitable bolts, tighten the fish-plate in place to firmly join the rail-sections.

D is the body of our nut-lock, which consists of a strip of steel wire, bent to form square loops $a\ a\ a\ a$, which fit about the nuts C. The ends of the body D are hooked, as at $d\ d$, and these hooks are sprung over the ends of the fish-plate, as shown in Fig. 2, and so as to project slightly behind the fish-plate.

D' is a cap-wire, having hooked ends $d'$, which, at its center, is loosely wound about the body D, while the hooks $d'$ are caught on the sides of the end loops $a\ a$.

To adjust our device to its place, first screw the nuts sufficiently tight onto their bolts and then place the lock on, so that each loop encompasses a nut and the hooked ends of the wires project around behind the ends of the fish-plate, then the hooked ends $d'$ of the rod D' are caught onto the end loops, as shown in Fig. 1, and the nuts will all be securely locked against turning.

We propose making our nut-lock of moderately flexible steel wire, and of any diameter which practice may suggest.

By the use of our device the necessity for screwing the nuts so tightly on their bolts that they are liable to be broken by changes of temperature is entirely obviated, as it will lock the nuts securely, no matter how loosely they may be screwed upon their bolts.

Having thus fully described our invention, what we claim as new, and desire to secure by Letters Patent, is—

1. A nut-lock having a body composed of wire, having three-sided loops, in combination with a flexible cap-wire, as set forth.

2. The combination, with a fish-plate and its securing nuts and bolts, of the nut-lock consisting of body D, having loops and end hooks, and the cap-wire, as set forth.

In testimony that we claim the foregoing we have hereunto set our hands, on this 13th day of February, 1883, in the presence of two witnesses.

MICHELANGELO WM. MEAGHER.
JAMES C. ANDERSON.

Witnesses:
JOHN ALLAN,
JOHN C. McDONALD.